(12) United States Patent
Dai et al.

(10) Patent No.: US 9,370,812 B2
(45) Date of Patent: Jun. 21, 2016

(54) RESHAPING DEVICE AND POSITIONING ASSEMBLY THEREOF

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Wei-Zhong Dai, Jiashan (CN); Dong-Dong Niu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 128 days.

(21) Appl. No.: 14/190,081

(22) Filed: Feb. 25, 2014

(65) Prior Publication Data

US 2014/0250964 A1    Sep. 11, 2014

(30) Foreign Application Priority Data

Mar. 8, 2013    (CN) .......................... 2013 1 00739199

(51) Int. Cl.
*B21D 1/06*    (2006.01)
*B21D 43/00*    (2006.01)
(Continued)

(52) U.S. Cl.
CPC ................ *B21D 1/06* (2013.01); *B21D 43/003* (2013.01); *B25B 11/00* (2013.01); *G01B 11/306* (2013.01); *B23P 6/00* (2013.01); *B25B 11/02* (2013.01)

(58) Field of Classification Search
CPC .............. B21D 1/00; B21D 1/06; B21D 1/08; B21D 1/10; B21D 22/04; B21D 43/003; B21D 43/26; B21D 43/287; G01B 11/306; B23P 6/00; B23P 9/00; B23P 9/02; B25B 11/00

USPC ................ 72/18.7, 19.7, 417, 421, 296, 312; 269/109, 111–125, 290–293, 297–299, 269/301, 303–306, 311, 313, 315, 318–320, 269/55, 60, 71; 29/281.1, 281.4
See application file for complete search history.

(56) References Cited

U.S. PATENT DOCUMENTS 4,775,135 A * 10/1988 Leibinger .............. B23D 33/10
269/118
(Continued)

FOREIGN PATENT DOCUMENTS

| CN | 101600303 A | 12/2009 |
| CN | 202479274 U | 10/2012 |

(Continued)

*Primary Examiner* — Peter DungBa Vo
*Assistant Examiner* — Joshua D Anderson
(74) *Attorney, Agent, or Firm* — ScienBiziP, P.C.

(57) ABSTRACT

A reshaping device for reshaping a workpiece, includes a worktable, a reshaping assembly, a measuring unit, a positioning assembly, and a controller electrically connected to the reshaping assembly, the measuring unit, and the positioning assembly. The positioning assembly includes a pair of positioning subassemblies and a movable supporting subassembly. Each positioning subassembly comprises a supporting bracket and two positioning members, the two supporting brackets are distributed on the worktable, spaced from each other, for holding the workpiece. The movable supporting subassembly comprises two transmission members and two driving members. The two transmission members are stacked on top of each other and disposed on the worktable. The two driving members are respectively assembled to the two transmission members and drive the two transmission members to slide along different directions, thereby supporting the workpiece. The present disclosure further discloses a positioning assembly.

16 Claims, 6 Drawing Sheets

(51) Int. Cl.
*B25B 11/00* (2006.01)
*G01B 11/30* (2006.01)
*B25B 11/02* (2006.01)
*B23P 6/00* (2006.01)

(56) References Cited

U.S. PATENT DOCUMENTS 7,310,987 B1 * 12/2007 Rupert .................... B21D 3/10
72/389.1

2004/0148997 A1 * 8/2004 Amino .................... B21D 11/02
72/297
2012/0011915 A1 * 1/2012 Kiridena ............... B21D 31/005
72/379.2
2012/0105867 A1 * 5/2012 Komatsu ................ G01B 11/25
356/610

FOREIGN PATENT DOCUMENTS

| CN | 103962418 A | 8/2014 |
| TW | M387719 U1 | 9/2010 |
| TW | M444236 U1 | 1/2013 |

* cited by examiner

US 9,370,812 B2

RESHAPING DEVICE AND POSITIONING ASSEMBLY THEREOF

BACKGROUND

1. Technical Field

The present disclosure relates to a reshaping/profile correction/profile adjustment/profile rectify device, and a positioning assembly thereof.

2. Description of Related Art

A flatness of a workpiece may be measured to determine whether the workpiece passes a flatness quality inspection or not. When the workpiece does not pass the quality inspection, a reshaping device is employed to reshape the workpiece. The reshaping device includes a worktable, and a reshaping assembly positioned on the worktable. When performing reshaping process, the workpiece is located upon the worktable and a deformed portion of the workpiece is aligned to the reshaping assembly. The reshaping assembly moves relative to the worktable and presses the deformed portion of the worktable, thereby reshaping the workpiece. However, a reshaping accuracy of the reshaping assembly is relatively low, because the workpiece deviates easily, causing periphery portions of the workpiece to be deformed. Such that, the workpiece needs to be reshaped again.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
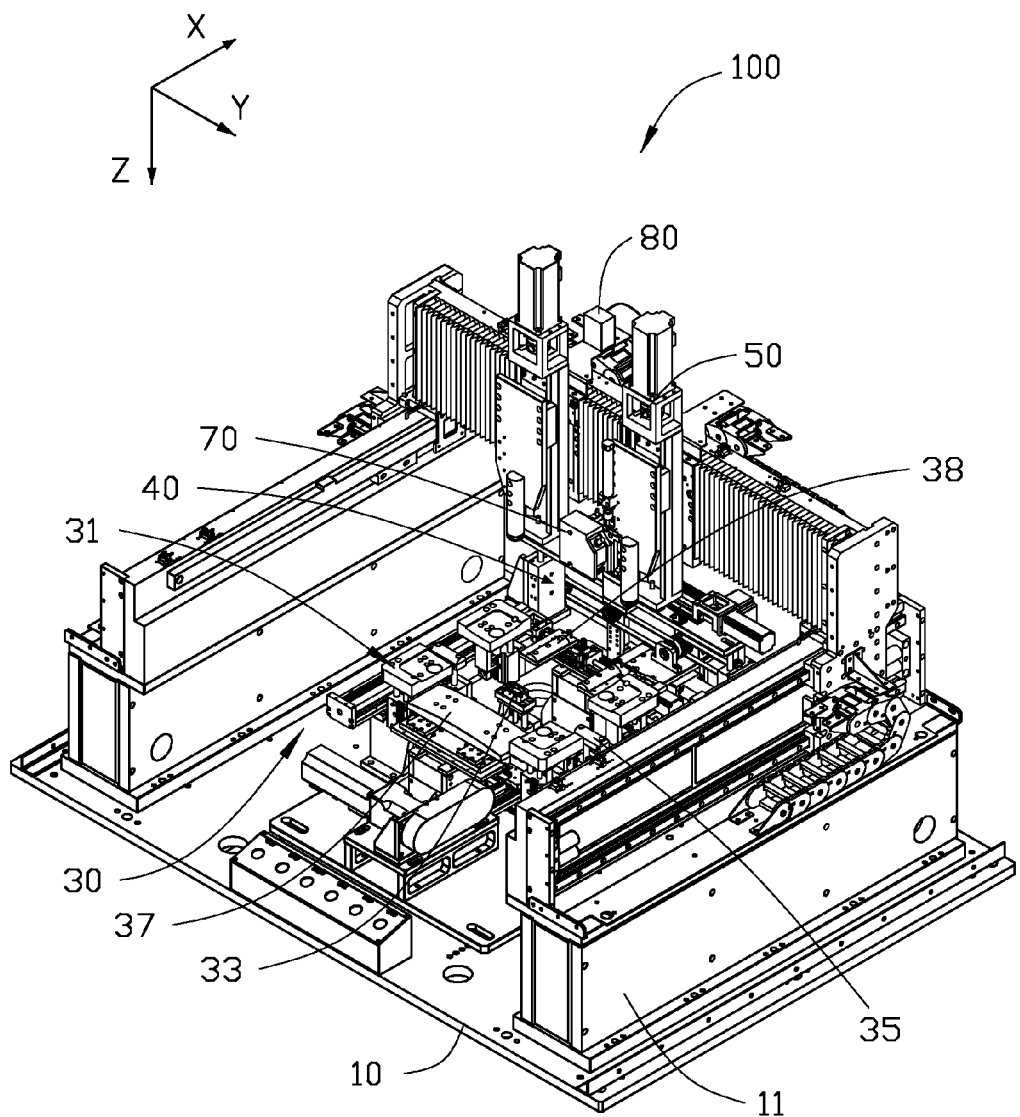
FIG. 1 is an isometric view of an embodiment of a reshaping device, the reshaping device includes a positioning assembly.

FIG. 1 shows an embodiment of a reshaping device 100 being employed to measure a flatness of a workpiece (not shown) and to reshape a workpiece which does not pass the flatness quality inspection. In the illustrated embodiment, the workpiece is substantially rectangular and made of metal. The workpiece is defined into a pair of length regions, a pair of width regions, and a central region on a top thereof. The central region is bound by the pair of length regions and the pair of width regions. A workpiece may have twisted or deformed portions on the top thereof.

The reshaping device 100 includes a worktable 10, a positioning assembly 30, a holding assembly 40, a reshaping assembly 50, a measuring unit 70, and a controller 80. The positioning assembly 30 is assembled to the worktable 10 to support the workpiece. The holding assembly 40 is assembled to the worktable 10 adjacent to the positioning assembly 30, for holding the workpiece on the positioning assembly 30. The reshaping assembly 50 is movably assembled to the worktable 10 and located above the positioning assembly 30, for reshaping deformed portions of the workpiece. The measuring unit 70 is assembled to the reshaping assembly 50, for measuring the flatness of the workpiece. The controller 80 is assembled to the reshaping assembly 50 and electrically connected to the positioning assembly 30, the holding assembly 40, the reshaping assembly 50, and the measuring unit 70. The measuring unit 70 obtains the flatness of the workpiece and transfers a flatness value to the controller 80. The controller 80 compares the flatness value of the workpiece with a preset flatness value range to determine whether the workpiece passes the quality inspection). When the workpiece does not pass the flatness quality inspection, the controller 80 controls the holding assembly 40 to hold the workpiece on the positioning assembly 30, and controls the reshaping assembly 50 to reshape the deformed portions of the workpiece.

The worktable 10 is substantially a rectangular plate and includes two guiding portions 11 located at opposite sides thereof. Each guiding portion 11 is arranged along an X-axis direction.

Figure 2:
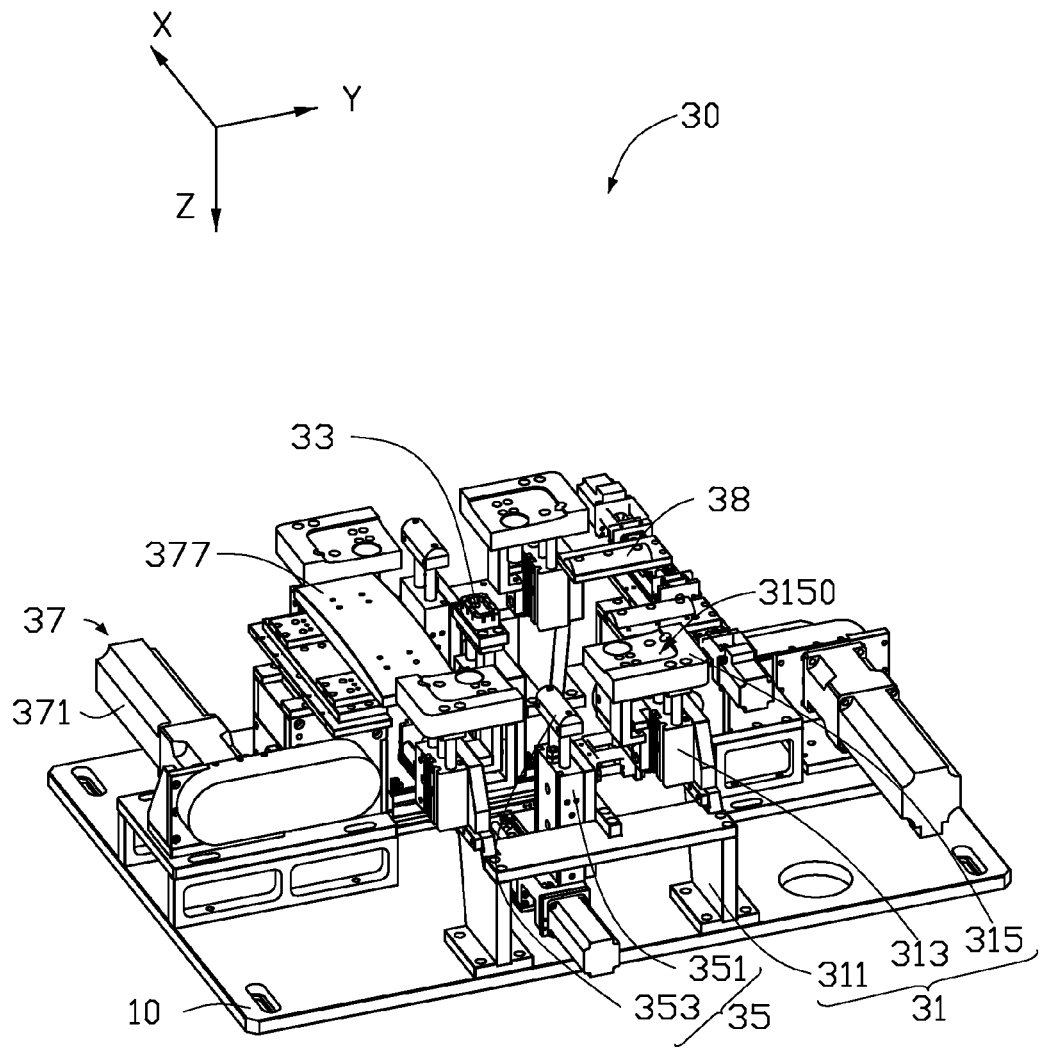
FIG. 2 is an isometric view of the positioning assembly of the reshaping device of FIG. 1, the positioning assembly includes a movable supporting subassembly, a second supporting subassembly, and a third supporting subassembly.
Figure 3:
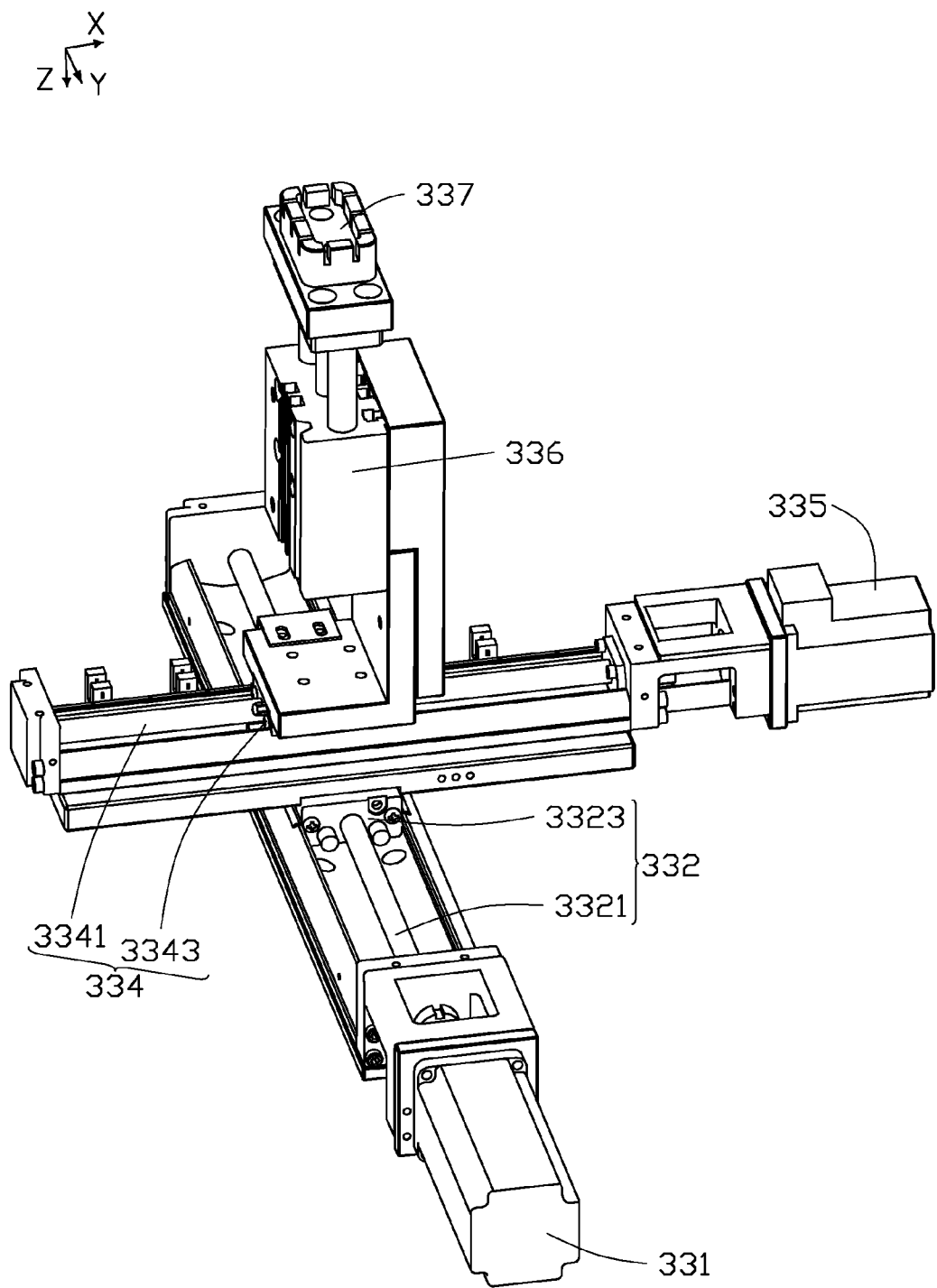
FIG. 3 is an isometric view of the movable supporting subassembly of the positioning assembly of FIG. 2.

FIG. 2 shows the positioning assembly 30 located on the worktable 10 and between the two guiding portions 11. The positioning assembly 30 includes a pair of positioning subassemblies 31, a movable supporting subassembly 33, a pair of first supporting subassemblies 35, a second supporting subassembly 37, and a third supporting subassembly 38. The pair of positioning subassemblies 31 is assembled to the worktable 10 and located opposite to each other. The movable supporting subassembly 33 is assembled to the worktable 10 and located between the pair of positioning subassemblies 31, for supporting the central region of the workpiece. The pair of first supporting subassemblies 35 is located between the pair of positioning subassemblies 31 and located at opposite sides of the movable supporting subassembly 33, for respectively supporting the pair of width regions of the workpiece. The second supporting subassembly 37 and the third supporting subassembly 38 are respectively located on opposite sides of the movable supporting subassembly 33, for supporting the pair of length regions of the workpiece, respectively.

Each positioning subassembly 31 includes a supporting bracket 311, a pair of driving members 313, and a pair of positioning members 315. The two supporting brackets 311 of the pair of positioning subassemblies 31 are substantially symmetrically mounted on the worktable 10. The two supporting brackets 311 are opposite to each other and located between the two guiding portions 11. A connecting line of the pair of supporting brackets 311 is perpendicular to a connecting line of the two guiding portions 11. The pair of driving members 313 is respectively assembled to opposite ends of the supporting bracket 311. The pair of positioning members 315 is respectively assembled to the pair of driving members 313 and located at a top of the supporting bracket 311. Each positioning member 315 defines a positioning groove 3150 in a top surface thereof to accommodate a corner of the workpiece. The positioning groove 3150 has a shape and a size equal to that of the corner of the workpiece. The positioning grooves 3150 of the pair of positioning subassemblies 31 are arranged symmetrically for accommodating four corners of the workpiece, thereby avoiding moving of the workpiece.

FIG. 2 shows the movable supporting subassembly 33 surrounded by the four positioning members 315. The movable supporting subassembly 33 includes a first driving member 331, a first transmission member 332, a second transmission member 334, a second driving member 335, a third driving member 336, and a resisting member 337. The first driving member 331 is assembled to the worktable 10 and adjacent to the supporting bracket 311 of one positioning subassembly 31. The first transmission member 332 is assembled to the worktable 10 and connected to the first driving member 331. The first transmission member 332 includes a first guiding rod 3321, and a first sliding block 3323. The first guiding rod 3321 is connected to the first driving member 331, the first sliding block 3323 is sleeved and engages with the first guiding rod 3321. The guiding rod 3321 is driven by the first driving member 331, thereby driving the first sliding block 3323 to slide along Y direction. The second transmission member 334 is assembled to the first sliding block 3323 perpendicular to the first transmission member 332. The second transmission member 334 is spaced from and parallel to the worktable 10. The second transmission member 334 includes a second guiding rod 3341 and a second sliding block 3343. The second guiding rod 3341 is fixedly connected to a side of the first sliding block 3323 opposite to the first guiding rod 3321. The second sliding block 3343 is sleeved and engages with the second guiding rod 3341. The second driving member 335 is assembled to an end of the second guiding rod 3341. The second guiding rod 3341 is driven by the second driving member 335, to drive the second sliding block 3343 to sliding along X direction. The third driving member 336 is assembled to the second sliding block 3343. The resisting member 337 is assembled to the third driving member 336, and driven by the third driving member 336 to slide along Z direction which is perpendicular to the worktable 10. The first driving member 331, the second driving member 335, and the third driving member 336 are electrically connected to the controller 80. The resisting member 337 is configured for moving along the X/Y/Z directions to support the central portions of the workpiece. In the embodiment, the first transmission member 332 and the second transmission member 334 are threaded leading rods.

FIG. 2 shows that the pair of first supporting subassemblies 35 is respectively assembled to the pair of supporting brackets 311. Each first supporting subassembly 35 includes a fourth driving member 351 and a first supporting member 353. The fourth driving member 351 is assembled to the supporting bracket 311, and located between the two positioning members 315. The first supporting member 353 is assembled to the fourth driving member 351, and driven by the fourth driving member 351 to slide along Z direction, for supporting the width regions of the workpiece.

Figure 4:
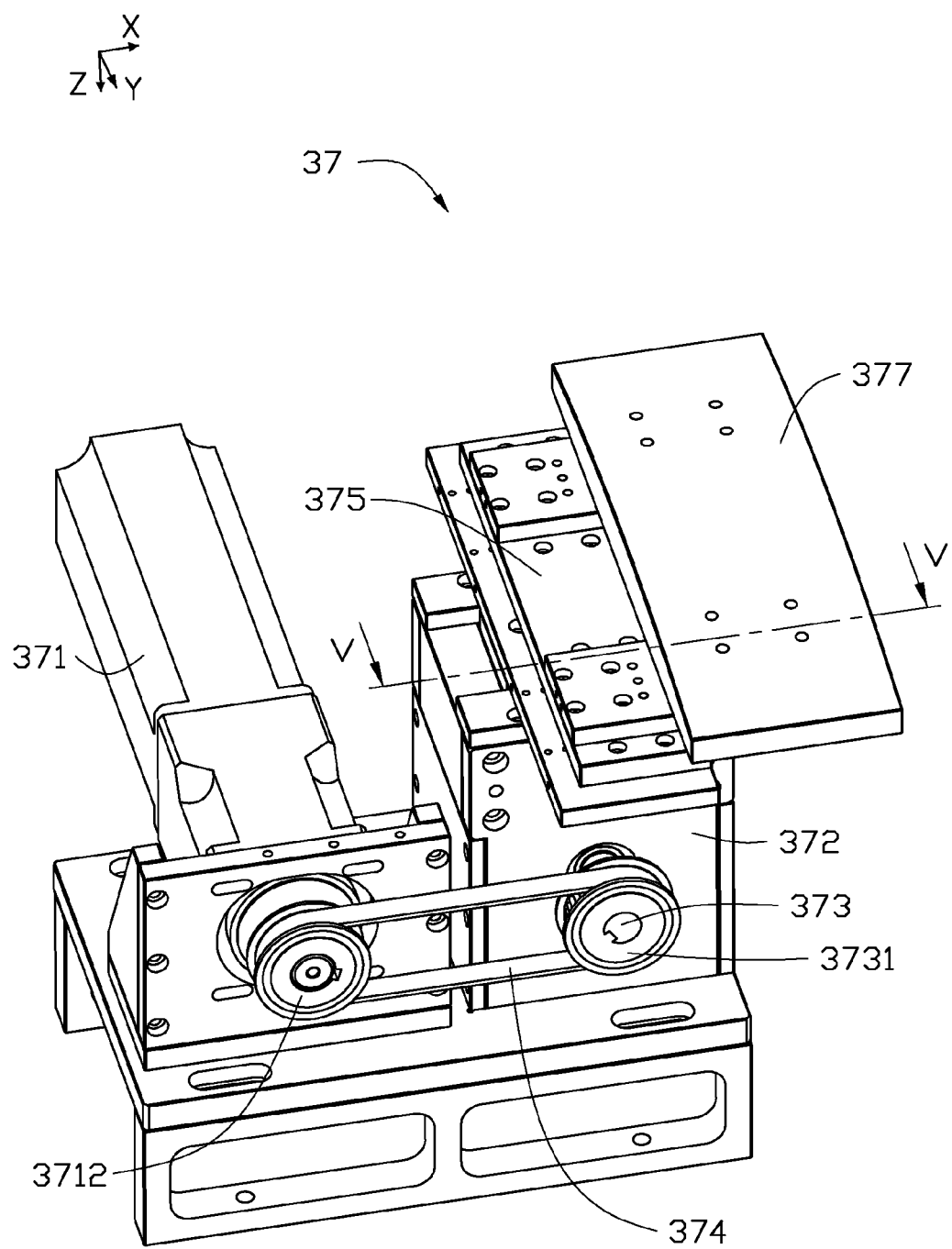
FIG. 4 is an isometric view of the second supporting subassembly of the positioning assembly of FIG. 2.
Figure 5:
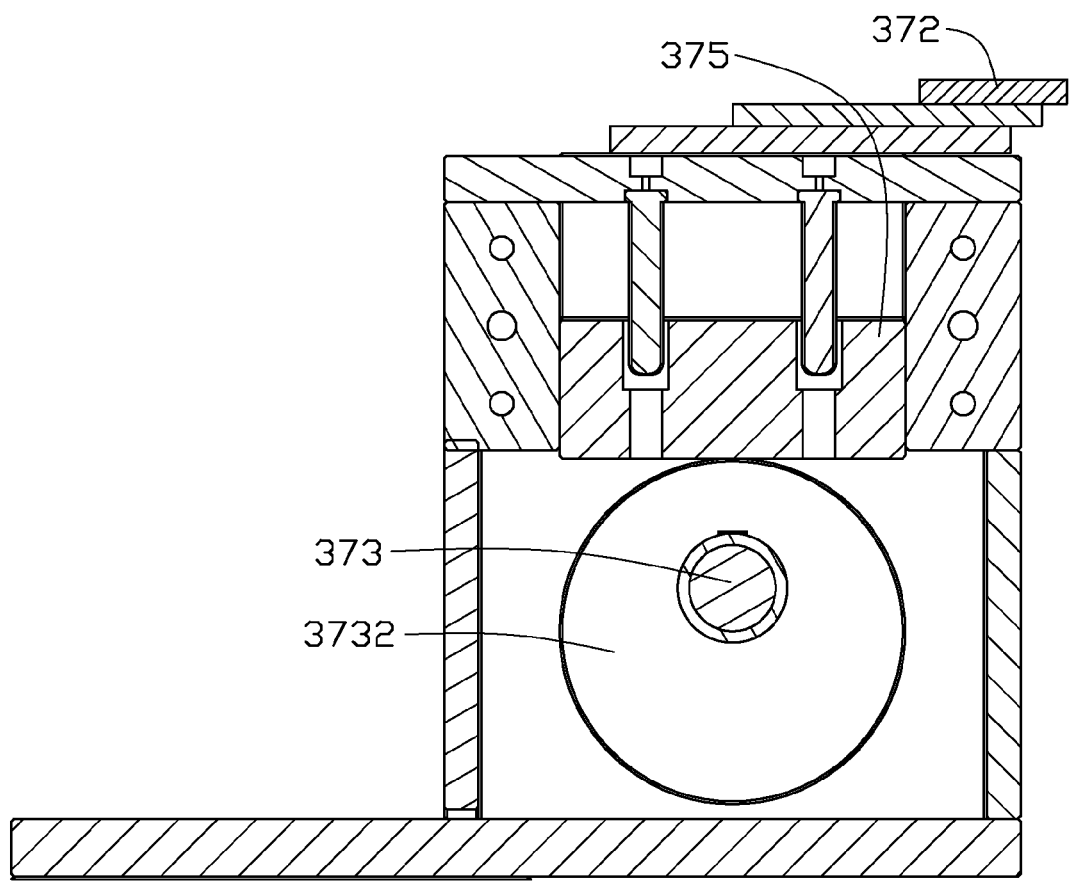
FIG. 5 is a cross-sectional view of the second supporting subassembly of FIG. 4, taken along line V-V.

FIGS. 1, 4 and 5 show the second supporting subassembly 37 assembled to the worktable 10 and partially located between the pair of positioning subassemblies 31. The second supporting subassembly 37 includes a fifth driving member 371, a mounting seat 372, a rotating shaft 373, a transmission belt 374, a pushing member 375, and a second supporting member 377. The fifth driving member 371 is assembled to an end of the worktable 10, and equipped with a transmission wheel 3712. The mounting seat 372 is assembled to the worktable 10 and positioned between the pair of supporting brackets 311. The rotating shaft 373 is rotatably assembled to the mounting seat 372, and equipped with a following wheel 3731 and a cam 3732 at opposite ends of the rotating shaft 373. The following wheel 3731 is exposed out of the mounting seat 372, and the cam 3732 is received in the mounting seat 372. The transmission belt 374 is sleeved on the transmission wheel 3712 and the following wheel 3731, respectively. The pushing member 375 is movably assembled to a top of the mounting seat 372 and resists the cam 3732. The second supporting member 377 is assembled to a side of the pushing member 375 away from the cam 3732. The fifth driving member 371 drives the cam 3732 to rotate via the transmission wheel 3712, the transmission belt 374, and the following wheel 3731, thereby driving the second supporting member 377 to move along Z direction, for supporting the length region of the workpiece.

Figure 6:
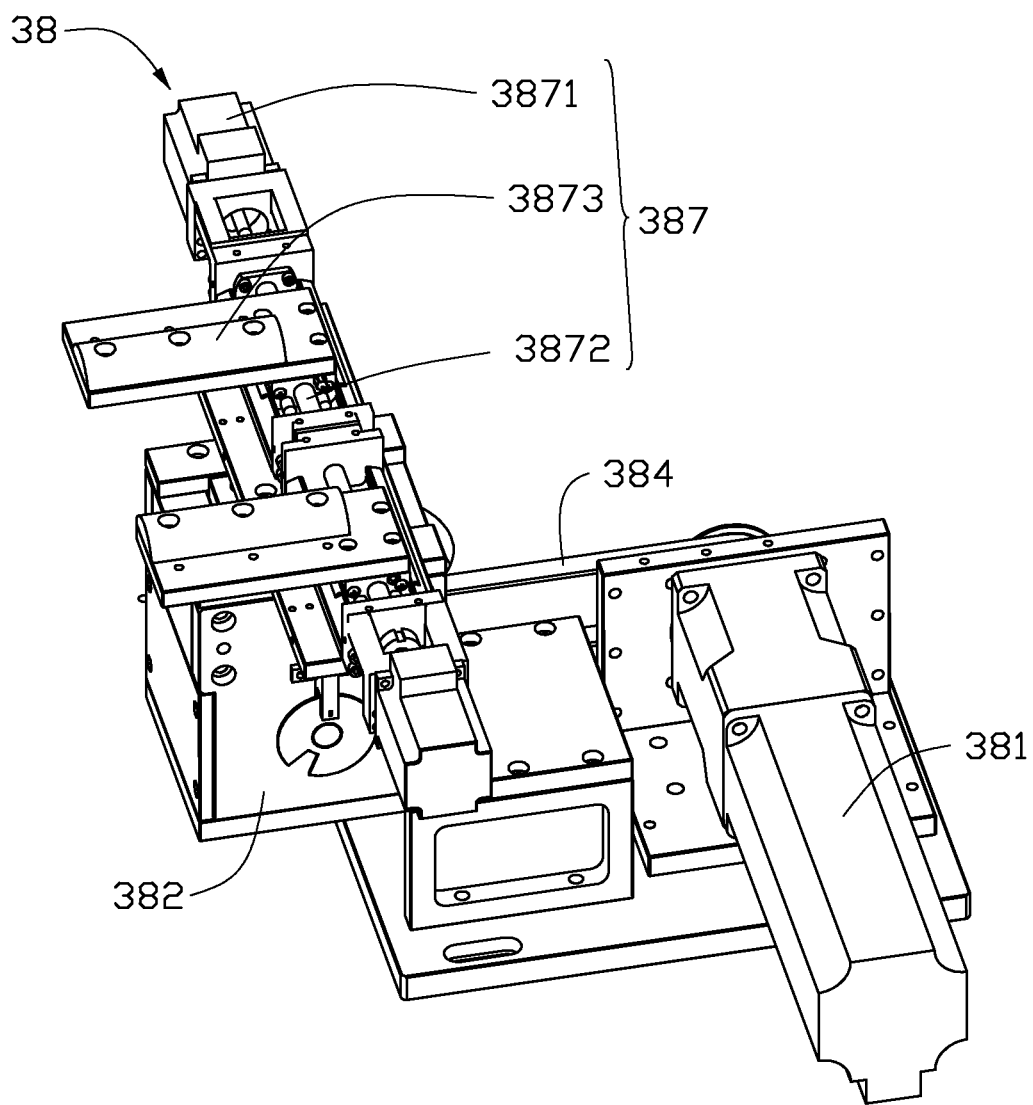
FIG. 6 is an isometric view of the third supporting subassembly of the positioning assembly of FIG. 2.

FIG. 6 shows the third supporting subassembly 38 assembled to the worktable 10 opposite to the second supporting subassembly 37. The third supporting subassembly 38 is partially located between the pair of positioning subassemblies 31. The structure of the third supporting subassembly 38 is substantially the same as the second supporting subassembly 37. The third supporting subassembly 38 includes a fifth driving member 381, a mounting seat 382, a rotating shaft (not shown), a transmission belt 384, a push member (not shown), and a second supporting member 387. The difference between the second supporting subassembly 37 and the third supporting subassembly 38 is that the second supporting member 387 includes a pair of sixth driving portions 3871, a pair of transmission portions 3872, and a pair of supporting portions 3873. The pair of sixth driving portions 3871 is symmetrically assembled to the push member, the pair of transmission portions 3872 is symmetrically arranged on the push member and respectively connected to the pair of sixth driving portions 3871. The pair of supporting portions 3873 is respectively sleeved on and is engaged with the pair of transmission portions 3872. In the embodiment, the pair of transmission portions 3872 is threaded lead rods. The pair of transmission portions 3872 is driven by the pair of sixth driving portions 3871 to drive the pair of supporting portions 3873 to slide along Y direction. The pair of supporting portions 3873 is capable of moving toward or away from each other to support the deformed portions on the length regions of the workpiece.

The holding assembly 40 is assembled to the worktable 10 and located adjacent to the positioning assembly 30. The holding assembly 40 is configured for moving perpendicularly to the worktable 10 and resisting non-deformed portions of the workpiece, thereby holding the workpiece upon the pair of positioning subassemblies 31.

The reshaping assembly 50 (see FIG. 1) is slidably supported by the pair of guiding portions 11, and located above the positioning assembly 30 and the holding assembly 40. The reshaping assembly 50 is capable of moving along the pair of guiding portions 11 and being aligned with the workpiece, so that the reshaping assembly 50 moves perpendicular to the worktable 10 and presses the deformed portions of the workpiece, thereby accomplishing a reshaping of the workpiece.

The measuring unit 70 is assembled to the reshaping assembly 50. The measuring unit 70 is moved along the X, Y, and Z-axis directions along with the reshaping assembly 50, to measure the flatness value of the workpiece. The measuring unit 70 transfers the flatness value to the controller 80. In the embodiment, the measuring unit 70 employs a laser to obtain the flatness value of the workpiece.

The controller 80 is assembled to the reshaping assembly 50 and electrically connected to the positioning assembly 30, the holding assembly 40, the reshaping assembly 50, and the measuring unit 70. The controller 80 receives the flatness value from the measuring unit 70, and compares the flatness value to the preset flatness value range to determine whether the workpiece passes the flatness quality inspection. When the workpiece does pass the flatness quality inspection, the controller 80 controls the holding assembly 40 to hold the workpiece on the positioning assembly 30, and controls the reshaping assembly 50 to reshape the deformed portions of the workpiece.

When in assembly, the pair of positioning subassemblies 31 is assembled to the worktable 10. The movable supporting subassembly 33 is mounted on the worktable 10 and is located between the pair of positioning subassemblies 31. The pair of first supporting subassemblies 35 is respectively assembled to the two supporting brackets 311 and are located at opposite sides of the movable supporting subassembly 33. The second supporting subassembly 37 and the third supporting subassembly 38 are assembled to the worktable 10. The second supporting subassembly 37 and the third supporting subassembly 38 are partially located between the pair of positioning subassemblies 31 and located at opposite sides of the movable supporting subassembly 33. The holding assembly 40 is assembled to the worktable 10 and is adjacent to the positioning assembly 30. The reshaping assembly 50 is slidably assembled to the pair of guiding portions 11, and is located above the positioning assembly 30 and the holding assembly 40. The measuring unit 70 and the controller 80 are assembled to the reshaping assembly 50. The controller 80 is electrically connected to the positioning assembly 30, the holding assembly 40, the reshaping assembly 50, and the measuring unit 70.

When in use, the workpiece is supported by and is partially received in the four positioning grooves 3150 of the positioning assembly 30. The measuring unit 70 is moved by the reshaping assembly 50 along the X-axis and the Y-axis directions to measure the workpiece, thereby obtaining the flatness value of the workpiece. The measuring unit 70 transfers the flatness value to the controller 80. The controller 80 stores the flatness value from the measuring unit 70 and compares the flatness value to the preset flatness value range to determine whether the workpiece pass the flatness quality inspection. When the workpiece is deemed to be not passing the flatness quality inspection, the controller 80 obtains the position values of the deformed portions of the workpiece, the positioning subassemblies 31 of the positioning assembly 30 is controlled by the controller 80 to support the deformed portions of the workpiece, according to the obtained position values. If the deformed portions are located on the central region of the workpiece, the movable supporting subassembly 33 drives the resisting member 337 to support the deformed portions. If the deformed portions are located on the width region of the workpiece, the first supporting members 353 are driven by the pair of first supporting subassemblies 35 to support the deformed portions. If the deformed portions are located on the length region of the workpiece, the second supporting members 377, 387 are driven by the second supporting subassembly 37 and the third supporting subassembly 38 to support the deformed portions. The controller 80 controls the holding assembly 40 to hold the workpiece on the positioning assembly 30. The reshaping assembly 50 reshapes the deformed portions of the workpiece. The measuring unit 70 measures the flatness of the workpiece after reshaping again and transfers the flatness value to the controller 80. Then, the controller 80 determines whether the workpiece passes the flatness quality inspection. If the workpiece still does not pass the flatness quality inspection, the workpiece is reshaped again until the flatness value is within the preset value range, or until an operator stops the reshaping process.

The positioning members 315 are employed to support the corners of the workpiece, therefore, the workpiece is difficult to move undesirably. The reshaping assembly 50 can reshape the workpiece more accurately. The resisting member 337 is driven by the first driving member 331 and the second driving member 335 along X/Y axis directions to be aligned to the deformed portions. Then the resisting member 337 is driven by the third driving member 336 to move along Z axis direction to support the deformed portions accurately, thereby avoiding an excessive reshaping on the workpiece and enhancing a reshaping efficiency of the reshaping device 100. Furthermore, the resisting member 337 is configured for moving along X/Y/Z directions, so that it is suitable for workpieces with different sizes.

The third supporting subassembly 38 may have a structure same as the second supporting subassembly 37. When the first transmission member 332 and the second transmission member 334 are designed for driving the resisting member 337 to support any portions of the workpiece, the pair of first supporting subassemblies 35, the second supporting subassembly 37 and the third supporting assembly 38 may be omitted. The numbers of the positioning subassemblies 31, the sixth driving members 3871, the transmission portions 3872, and the supporting portions 3873 are not limited to a number of two, but they may be one or more than two. When the positioning members 315 can hold the workpiece stability, the holding assembly 40 may be omitted. When the positioning members 315 are mounted on a top of the supporting brackets 311 away from the worktable 10, the driving members 313 may be omitted. The fourth driving members 351 may be directly assembled to the worktable 10. When the resisting member 337, the second transmission member 334, and the first transmission member 332 are stacked on top of each other in that order, with extending directions not parallel, the resisting member 337 is able to move in tri-dimensional directions (along X/Y/Z directions), the first transmission member 332 may not be perpendicular to the second transmission member 334, and the second transmission member 334 may not be perpendicular to the resisting member 337. When the second transmission member 334 is directly assembled to the worktable 10, and the resisting member 337 has a shape corresponding to the workpiece, the first transmission member 332 may be omitted.

Finally, while various embodiments have been described and illustrated, the disclosure is not to be construed as being limited thereto. Those skilled in the art can make various modifications to the embodiments without departing from the true spirit and scope of the disclosure as defined by the appended claims.

What is claimed is:

1. A reshaping device for reshaping a workpiece having deformed portions, comprising:
    a worktable,
    a reshaping assembly assembled to the worktable,
    a measuring unit assembled to the reshaping assembly,
    a controller assembled to the reshaping assembly, and electrically connected to the reshaping assembly and the measuring unit, and
    a positioning assembly electrically connected to the controller, wherein the positioning assembly comprises a pair of positioning subassemblies and a movable supporting subassembly, each positioning subassembly comprises a supporting bracket and at least two positioning members, the supporting brackets of the pair of positioning subassemblies are mounted on the worktable, the at least two positioning members of each positioning subassembly are assembled to one corresponding supporting bracket and spaced from each other for holding the workpiece, the movable supporting subassembly comprises at least two transmission members and at least two driving members, the at least two transmission members are stacked on top of each other and disposed on the worktable, and located adjacent to one positioning subassembly, the at least two driving members are respectively assembled to the at least two transmission members and drive the at least two transmission members to slide along different directions, thereby supporting deformed portions of the workpiece, and wherein the positioning assembly further comprises a second supporting subassembly and a third supporting subassembly, the second supporting subassembly and the third supporting subassembly are assembled to the worktable and opposite to each other, each of the second supporting subassembly and the third supporting subassembly comprises a fifth driving member, a pushing member, and a second supporting member, the fifth driving member is assembled to an end of the worktable and pushes the pushing member, the second supporting member is assembled to the pushing member for supporting the workpiece, the second supporting member of the third supporting subassembly comprises a pair of sixth driving portions, a pair of transmission portions, and a pair of supporting portions, the pair of sixth driving portions is symmetrically assembled to the pushing member, the pair of transmission portions is symmetrically arranged on the pushing member and respectively connected to the pair of sixth driving portions, the pair of supporting portions respectively engages with the pair of transmission portions, the pair of transmission portions is driven by the pair of sixth driving portions to drive the pair of supporting portions to slide toward or away from each other, thereby supporting deformed portions of the workpiece.

2. The reshaping device of claim 1, wherein the at least two transmission members comprises a first transmission member, a second transmission member, and a resisting member, the at least two driving members comprises a first driving member, a second driving member, and a third driving member, the first transmission member is assembled to the worktable and connected to the first driving member, the second transmission member is assembled to the first transmission member and connected to the second driving member, the third driving member is assembled to the second transmission member and connected to the resisting member.

3. The reshaping device of claim 2, wherein the first driving member, the second driving member, and the third driving member are electrically connected to the controller, the second transmission member is driven by the first transmission member to move along a first direction, the third driving member is driven by the second transmission member to move along a second direction intersecting with the first direction, the resisting member is driven by the third driving member to move along a third direction intersecting with the first direction and the second direction, the first direction, the second direction, and the third directions constitute a tri-dimensions direction to enable the resisting member to support deformed portions of the workpiece.

4. The reshaping device of claim 3, wherein the positioning assembly further comprises a pair of first supporting subassemblies respectively assembled to the pair of supporting brackets, each first supporting subassembly comprises a fourth driving member and a first supporting member, the fourth driving member is assembled to the supporting bracket, the first supporting member is assembled to the fourth driving member, and driven by the fourth driving member to slide along the third direction, for supporting the workpiece.

5. The reshaping device of claim 3, wherein each of the second supporting subassembly and the third supporting subassembly further comprises a mounting seat, a rotating shaft, and a transmission belt, the mounting seat is assembled to the worktable and positioned opposite to the fifth driving member, the rotating shaft is rotatably assembled to the mounting seat, the transmission belt is sleeved on the fifth driving member and the rotating shaft, the pushing member is movably mounted on the mounting seat and resisted by the rotating shaft.

6. The reshaping device of claim 5, wherein the fifth driving member is equipped with a transmission wheel, the rotating shaft is equipped with a following wheel and a cam at opposite ends thereof, the following wheel exposes out of the mounting seat and the cam is received in the mounting seat, the transmission belt is sleeved on the transmission wheel and the following wheel, the pushing member is resisted by the cam.

7. The reshaping device of claim 3, wherein each positioning member defines a positioning groove in a top surface thereof to accommodate a corner of the workpiece, the positioning grooves of the pair of positioning subassemblies are arranged symmetrically for accommodating four corners of the workpiece.

8. The reshaping device of claim 3, wherein the first transmission member comprises a first guiding rod and a first sliding block slidably engaging with the first guiding rod, the second transmission member comprises a second guiding rod, and a second sliding block slidably engaging with the second guiding rod, the second guiding rod is arranged perpendicular to the first guiding rod and assembled to the first sliding block, the third driving member is assembled to the second sliding block.

9. A positioning assembly for positing a workpiece having deformed portions, comprising:
a pair of positioning subassemblies each comprising a supporting bracket and at least two positioning members, the supporting brackets of the pair of positioning subassemblies being separated from each other, the at least two positioning members of each positioning subassembly being assembled to one corresponding supporting bracket and spaced from each other for holding the workpiece,
a movable supporting subassembly comprising at least two transmission members and at least two driving members, wherein the at least two transmission members are stacked on top of each other and located adjacent to one positioning subassembly, the at least two driving members are respectively assembled to the at least two transmission members and drive the at least two transmission members to slide along different directions, thereby supporting deformed portions of the workpiece, and
a second supporting subassembly and a third supporting subassembly, the second supporting subassembly and the third supporting subassembly are assembled to the worktable and opposite to each other, each of the second supporting subassembly and the third supporting subassembly comprises a fifth driving member, a pushing member, and a second supporting member, the fifth driving member pushes the pushing member, the second supporting member is assembled to the pushing member for supporting the workpiece, the second supporting member of the third supporting subassembly comprises a pair of sixth driving portions, a pair of transmission portions, and a pair of supporting portions, the pair of sixth driving portions is symmetrically assembled to the pushing member, the pair of transmission portions is symmetrically arranged on the pushing member and respectively connected to the pair of sixth driving portions, the pair of supporting portions respectively engages with the pair of transmission portions, the pair of transmission portions is driven by the pair of sixth driving portions to drive the pair of supporting portions to slide toward or away from each other, thereby supporting deformed portions of the workpiece.

10. The positioning assembly of claim 9, wherein the at least two transmission members comprises a first transmission member, a second transmission member, and a resisting member, the at least two driving members comprises a first driving member, a second driving member, and a third driving member, the first transmission member is connected to the first driving member, the second transmission member is assembled to the first transmission member and connected to the second driving member, the third driving member is assembled to the second transmission member and connected to the resisting member.

11. The positioning assembly of claim 10, wherein the second transmission member is driven by the first transmission member to move along a first direction, the third driving member driven by the second transmission member to move along a second direction intersecting with the first direction, the resisting member is driven by the third driving member to move along a third direction intersecting with the first direction and the second direction, the first direction, the second direction and the third direction constitute a tri-dimensions direction to enable the resisting member to support deformed portions of the workpiece.

12. The positioning assembly of claim 11, further comprising a pair of first supporting subassemblies respectively assembled to the pair of supporting brackets, wherein each first supporting subassembly comprises a fourth driving member and a first supporting member, the fourth driving member is assembled to the supporting bracket, the first supporting member is assembled to the fourth driving member, and driven by the fourth driving member to slide along the third direction, for supporting the workpiece.

13. The positioning assembly of claim 11, each of the second supporting subassembly and the third supporting subassembly further comprises a mounting seat, a rotating shaft, and a transmission belt, the mounting seat is positioned opposite to the fifth driving member, the rotating shaft is rotatably assembled to the mounting seat, the transmission belt is sleeved on the fifth driving member and the rotating shaft, the pushing member is movably mounted on the mounting seat and resisted by the rotating shaft.

14. The positioning assembly of claim 13, wherein the fifth driving member is equipped with a transmission wheel, the rotating shaft is equipped with a following wheel and a cam at opposite ends thereof, the following wheel exposes out of the mounting seat and the cam is received in the mounting seat, the transmission belt is sleeved on the transmission wheel and the following wheel, the pushing member is resisted by the cam.

15. The positioning assembly of claim 11, wherein each positioning member defines a positioning groove in a top surface thereof to accommodate a corner of the workpiece, the positioning grooves of the pair of positioning subassemblies are arranged symmetrically for accommodating four corners of the workpiece.

16. The positioning assembly of claim 11, wherein the first transmission member comprises a first guiding rod and a first sliding block slidably engaging with the first guiding rod, the second transmission member comprises a second guiding rod, and a second sliding block slidably engaging with the second guiding rod, the second guiding rod is arranged perpendicular to the first guiding rod and assembled to the first sliding block, the third driving member is assembled to the second sliding block.

* * * * *